United States Patent [19]

LaRoche, Jr.

[11] Patent Number: 5,158,917
[45] Date of Patent: Oct. 27, 1992

[54] SET UP COMPRISING AN EXPENDABLE PATTERN AND A GAS-PERMEABLE CONFORMABLE MATERIAL

[75] Inventor: E. Allen LaRoche, Jr., Middletown, Del.

[73] Assignee: Lanxide Technology Company, LP, Newark, Del.

[21] Appl. No.: 593,189

[22] Filed: Oct. 5, 1990

Related U.S. Application Data

[63] Continuation of Ser. No. 281,263, Dec. 7, 1988, Pat. No. 5,000,894, which is a continuation of Ser. No. 206,998, Jun. 13, 1988, Pat. No. 4,830,799, which is a continuation of Ser. No. 1,061, Jan. 7, 1987, abandoned.

[51] Int. Cl.$^5$ ............................................. C04B 35/65
[52] U.S. Cl. ................................... 501/127; 501/128; 501/94; 428/614; 428/621; 249/83
[58] Field of Search ................ 428/614, 621; 501/127, 501/128, 94; 249/83

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,055,451 | 10/1977 | Cockbain et al. | 156/89 |
| 4,647,414 | 3/1987 | Mizuno et al. | 264/65 |
| 4,657,876 | 4/1987 | Hillig | 501/87 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"—M. Drouzy and M. Richard—Mar., 1974 Fonderie, France No. 332 pp. 121-128.

"Refractories for Aluminum Alloy Melting Furnaces'-'—B. Clavaud and V. Jost—Sep., 1980—Lillian Brassinga (from French) Jan., 1985.

*Primary Examiner*—Karl Group
*Attorney, Agent, or Firm*—Mark G. Mortenson; William E. McShane

[57] ABSTRACT

A method of producing shaped, self-supporting ceramic bodies includes preparing a mold by applying a permeable, conformable material to a shape-defining surface of an expendable pattern. The permeable, conformable material, when set or stable, provides a mold with a shaped surface which is defined by, and is therefore substantially congruent to, the shape-defining surface. Upon heating, the material of the expendable pattern combusts or volatilizes and thus establishes the shaped cavity mold. A molten parent metal is then vaporized with a vapor-phase oxidant in such a manner as to form a ceramic body which grows into the mold cavity, and is shaped by it. The ceramic body is recovered from the mold having a shaped surface replicating the shape-defining surface of the expandable pattern.

16 Claims, 2 Drawing Sheets

SET UP COMPRISING AN EXPENDABLE PATTERN AND A GAS-PERMEABLE CONFORMABLE MATERIAL

This is a continuation of copending application Ser. No. 07/281,263 filed on Dec. 7, 1988, now U.S. Pat. No. 5,000,894 which in turn is a continuation of U.S. Ser. No. 206,998, filed Jun. 13, 1988 now U.S. Pat. No. 4,830,799, which issued on May 16, 1989, which is a continuation of U.S. application Ser. No. 07/001,061 filed on Jan. 7, 1987, now abandoned.

FIELD OF THE INVENTION

The present invention broadly relates to methods of making shaped ceramic bodies. In particular, the invention relates to methods of making ceramic bodies comprising the oxidation reaction product of a parent metal and an oxidant, and having selected geometry formed by replicating the shape of an expendable pattern.

BACKGROUND AND DESCRIPTION OF COMMONLY OWNED PATENT APPLICATIONS

The method of growing a ceramic product by an oxidation reaction is disclosed generally in copending Commonly Owned U.S. patent application Ser. No. 818,943, filed Jan. 15, 1986, and its ancestor applications (now abandoned), all in the names of Marc S. Newkirk et al. and entitled "Novel Ceramic Materials and Methods of Making the Same." U.S. patent application No. 818,943, issued to U.S. Pat. No. 4,713,360, on Dec. 15, 1978. These applications and patent disclose the method of producing self-supporting ceramic bodies grown as the oxidation reaction product of a parent metal precursor which may be enhanced by the use of an alloyed dopant. Molten parent metal is reacted with a vapor-phase oxidant to form the oxidation reaction product. In the appropriate temperature range, molten metal is progressively drawn through the oxidation reaction product and into contact with the oxidant thereby continuing to form additional oxidation reaction product and developing the ceramic body. The method was improved upon by the use of external dopants applied to the surface of the precursor parent metal as disclosed in Commonly Owned U.S. application Ser. No. 822,999, filed Jan. 27, 1986, and its ancestor applications (now abandoned), all in the names of Marc S. Newkirk et al. and entitled "Methods of Making Self-Supporting Ceramic Materials." U.S. Pat. No. 4,853,352, issued on Aug. 1, 1989, from U.S. patent application Ser. No. 220,935, which was filed on Jun. 23, 1988, as a continuation of U.S. patent application Ser. No. 822,999.

The method of fabricating a ceramic composite product by infiltrating an inert filler material with an oxidation reaction product produced in accordance with the procedures disclosed in the above applications is disclosed generally in U.S. Pat. No. 4,851,375 which issued on Jul. 25, 1989, from Commonly Owned U.S. patent application Ser. No. 819,397, filed Jan. 17, 1986, as a continuation-in-part application of Ser. No. 697,876, filed Feb. 4, 1985 (now abandoned), both in the names of Marc S. Newkirk et al. and entitled "Composite Ceramic Articles and Methods of Making Same". These applications and patent disclose a method for fabricating a ceramic composite by growing an oxidation reaction product into an inert filler by placing a mass of said filler adjacent to a parent metal and reacting the parent metal in accordance with the oxidation reaction disclosed above.

Barrier materials may be employed to substantially inhibit or prevent the growth of the oxidation reaction product in order to facilitate obtaining a net shape ceramic product. This concept was disclosed in copending Commonly owned U.S. Pat. No. 4,923,832, which issued on May 8, 1990, from U.S. patent application Ser. No. 861,024, filed May 8, 1986, in the names of Marc S. Newkirk et al. and entitled "Method of Making Shaped Ceramic Composites with the Use of a Barrier".

The entire disclosures of each of the foregoing Commonly Owned Patent Applications and patents, which are assigned to the same owner, are expressly incorporated herein by reference.

There is an increased interest in substituting ceramics for metals because, with respect to certain properties, ceramics are superior to metals. There are, however, several known limitations or difficulties in making this substitution such as scaling versatility, capability to produce complex shapes, satisfying the properties required for the end use application, and costs. The above-described Commonly Owned Patent Applications and patents overcome many of these difficulties or limitations and provide novel methods for reliably producing ceramic materials, including composites.

However, the ability to grow an oxidation reaction product having a defined shape or geometry in the absence of a preform still presents certain difficulties. In many cases, post-process shaping of the oxidation reaction product is necessary to attain a shape. The present invention provides a reliable method for growing the oxidation reaction product to a predetermined shape or geometry.

SUMMARY OF THE INVENTION

The present invention provides a method for producing a ceramic component comprising the oxidation reaction product of a molten parent metal and a vapor-phase oxidant, which replicates the geometry of an expendable pattern. In the practice of the present invention, a body of parent metal and an expendable pattern having a shape-defining surface are provided such that the shape-defining surface of the pattern is spaced outwardly from the body of parent metal. "Expendable" in the present context means that the pattern is composed of a material such as a wax or plastic which is effectively eliminated under process conditions such as by heating.

A gas-permeable coating of conformable material or coating material (described below in greater detail) is applied to the shape defining surface of the pattern to establish a congruent surface with the coating of conformable material which is substantially congruent to and coextensive with the shape-defining surface of the pattern. This congruent surface is disposed oppositely from the body of parent metal such that the expendable pattern defines a volume between the parent metal and shape-defining surface. The coating material has an intrinsically self-bonding support zone which is immediately adjacent to and coextensive with the shape-defining surface of the pattern, and which is intrinsically self-bonding to provide sufficient cohesive strength such that the coating material will retain the shape or geometry of the congruent surface without collapsing or degrading, and form a mold cavity within the coating material upon elimination of the expendable pattern.

This setup is heated in the presence of a vapor-phase oxidant above the melting point of the parent metal, but below the melting point of the oxidation reaction product of the parent metal and vapor-phase oxidant, forming a body of molten parent metal, and the expendable pattern is eliminated. Elimination of the expendable pattern is effected by volatilization, combustion, or the like depending on the particular pattern material. Typically, the expendable pattern is constructed of a material such as a plastic or wax which combusts or volatilizes on exposure to process temperatures. Upon elimination of the pattern, a mold cavity is developed between the congruent surface established by the coating material and the parent metal. The congruent surface of the coating material defining the mold cavity replicates, or is the positive impression of, the shaped-defining surface of the patter.

At that temperature, the molten parent metal reacts with the vapor-phase oxidant to form a layer of oxidation reaction product. Molten parent metal is drawn into and transported through this layer toward the oxidant and the coating material. As the molten parent metal contacts the vapor-phase oxidant at the interface between the vapor-phase oxidant and previously formed oxidation reaction product, it reacts forming a progressively thicker body of oxidation reaction product into the mold cavity developing toward the coating material. The oxidation reaction is continued for a time sufficient to fill the mold cavity with oxidation reaction product.

In one embodiment of the present invention, the coating material comprises a suitable barrier material (as disclosed in Commonly Owned U.S. Pat. No. 4,923,832, such as calcium silicate or plaster of paris, which inhibits growth of the oxidation reaction product at the established congruent surface. In this case, the product comprises a ceramic component comprising the oxidation reaction product having a shaped surface replicating the shape-defining surface of the expendable pattern.

In another embodiment of the present invention, the coating material comprises a filler material (as disclosed in Commonly Owned U.S. Pat. No. 4,923,832 which is infiltrated by growth of the oxidation reaction product. The oxidation reaction is continued for a time sufficient to fill the mold cavity with oxidation reaction product and additionally to infiltrate the filler to a desired depth. In this case, the resulting product comprises a ceramic component comprising the oxidation reaction product having a shaped surface replicating the shape-defining surface of the expendable pattern, and additionally a ceramic composite containing the filler formed integrally with the shaped surface of the ceramic component.

In still another embodiment of the present invention, a filler is positioned between the parent metal and expendable pattern prior to heating such that the developing oxidation reaction product will first infiltrate that filler before filling the mold cavity. The resulting product is a ceramic component comprising the oxidation reaction product having a shaped surface replicating the shape-defining surface of the expendable pattern, and integrally formed with a ceramic composite disposed oppositely from the shaped surface. In accordance with the present embodiment, the coating material employed may be either a barrier material or a second filler material having a support zone.

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1–40% by volume, but may include still more metal. "Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these (e.g., a solid and a gas) at the process conditions.

"Parent metal" as used in this specification and the appended claims refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

DETAILED DESCRIPTION OF THE INVENTION AND PREFERRED EMBODIMENTS

Figure 1:
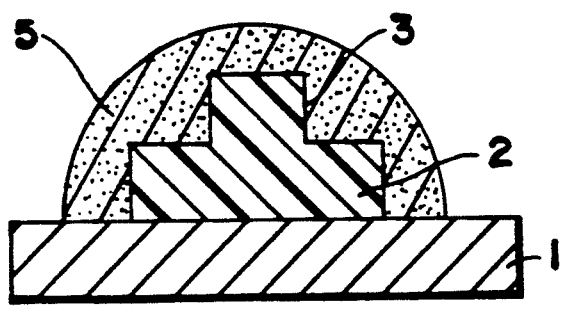
FIG. 1 is a cross-sectional view in elevation of a solid expendable pattern in contact with a parent metal body and having a gas-permeable coating of conformable material applied to its shape-defining surface.

In accordance with the present invention, a parent metal (which may be doped as discussed below in greater detail) and an expendable pattern having a shape-defining surface spaced outwardly from the parent metal are provided. Typically, the parent metal is formed into an ingot, billet, rod, plate, or the like, and placed in an inert bed, crucible or other refractory container with a surface exposed to the atmosphere, and which is suitable for provision of an expendable pattern.

An expendable pattern may be constructed of any suitable material which will be eliminated under process conditions. Elimination may be by, for example, volatilization or combustion of the pattern material. Generally, pattern materials which will volatilize or combust on heating without leaving ash or residue are preferred since such residue may be undesirable if allowed to remain in the mold cavity after elimination of the pattern. Suitable pattern materials may comprise, for example, expanded polystyrene, polyurethane, polyethylene, or waxes. A pattern material should be selected which is compatible with the particular process temperature range, the vapor-phase oxidant being employed and with the coating material (discussed below in greater detail) employed particularly with regard to vehicles or media used to apply the coating material to the pattern. Additionally, certain pattern materials may lend themselves more readily than others to certain shaping techniques.

The pattern material may be suitably shaped into the expendable pattern by any appropriate means. For example, the pattern material may be shaped by conventional processes, including injection molding, blow molding, extrusion, casting, machining and the like. Injection molding is currently one preferred method for making large numbers of patterns. Blow molding also may be preferred in other embodiments for its ability to produce hollow expendable molds. Blow molding may be particularly desirable because it minimizes the amount of pattern material employed in the pattern in order to facilitate a more rapid elimination of the pattern during the process. The pattern may have grooves, bores, recesses, lands, bosses, flanges, studs, screw threads and the like formed therein as well as having collars, bushings, discs, bars, or the like assembled thereto to provide patterns of virtually any desired configuration. The pattern may also comprise one or more unitary pieces suitably so that when assembled or joined and coated with a coating material, the assembly of patterns serves the functional equivalent of a one-piece pattern.

A gas-permeable coating of conformable material, or coating material, is applied to the shape defining surface of the expendable pattern to form a congruent surface which is substantially congruent to and coextensive with the shape-defining surface of the pattern such that the expendable pattern defines a volume between the parent metal and the shape-defining surface. The coating material confirms to the surface geometry of the pattern, and forms or attains a support zone to effect structural integrity such that upon elimination of the expendable pattern the coating material will not collapse into the resulting mold cavity, and will also retain the positive impression of the shape-defining surface of the expendable pattern. Additionally, the coating material is sufficiently permeable to the vapor-phase oxidant to allow passage of the oxidant into the mold cavity to facilitate oxidation of the molten metal therewithin.

To facilitate structural integrity, the coating material has a support zone directly adjacent to the shape-defining surface of the expendable pattern. The support zone enables the coating material to be both self-supporting and retain the geometry of the shape-defining surface of the pattern. A support zone can be formed with the addition of suitable bonding agents such as materials as silica or inorganic clays, such as hydrous aluminum silicates, which will sinter or self-bond at process temperature. For example, a layer of silica can be applied to the shape-defining surface of the expendable pattern with a suitable glue or binder. The coating material is thereafter applied over the layer of silica. When heated to process temperature, the silica will sinter or bond, thereby establishing a support zone directly adjacent to the shape-defining surface. Moreover, certain coating materials will inherently form a support zone after application to the expendable pattern. For example, plaster of paris may be employed as a coating material which will form a support zone by hydration. The thickness necessary for the support zone will depend largely upon the particular process parameters employed. Generally, however, the support zone must have at least sufficient strength to support the weight of the coating material during processing. Therefore, factors to be considered in prescribing a support zone are the size and geometry of the expendable pattern, the coating material employed, reaction time, parent metal, oxidation conditions, etc.

In one embodiment of the present invention, the coating material comprises a barrier material, as disclosed in Commonly Owned U.S. Pat. No. 4,923,832 referred to above, to inhibit growth of the oxidation reaction product beyond the congruent surface. Thus, growth of the oxidation reaction product is substantially contained within the mold cavity. As disclosed in the above-mentioned U.S. patent, suitable barrier materials may be any material, compound, element, composition, or the like, which, under the process conditions of this invention, maintain some integrity, is not volatile, and preferably is permeable to the vapor-phase oxidation while being capable of locally inhibiting, poisoning, stopping, interfering with, preventing, or the like, continued growth of oxidation reaction product. Suitable barriers for use with aluminum parent metal and oxygen-containing gas oxidants include calcium sulfate (plaster of paris), calcium silicate such as Wollastonite, Portland cement, and combinations of either. Still further, when a barrier material is employed as a coating material, a suitable refractory particulate may also be included to reduce any possible shrinkage or cracking which otherwise may occur during the process on heating and which would degrade the fidelity of replication. As discussed above, many of these barrier materials and inherently self-supporting when allowed to set or hydrolyze. In such a case, provision of a separate support zone may be unnecessary.

In another embodiment, the matrix material comprises a filler which can be infiltrated by growth of the oxidation reaction product. Such filler materials and the infiltration of such fillers by a matrix of oxidation reaction product are disclosed in the above-referenced Commonly Owned U.S. Pat. No. 4,851,375. They may include particles, fibers, rods, etc. Typically, the filler material comprises particles such as alumina or silicon carbide employed in conventional ceramic fabrication technology. The filler material is supplied with a support zone as discussed above, and applied to the shape-defining surface of the expendable pattern. For example, alumina filler may be admixed with a quantity of silica suitable to form a support zone at process temperature. Alternatively, a quantity of silica may also be coated directly on the shape-defining surface of the expendable pattern, and the alumina filler coated over the silica. In the present embodiment, the congruent surface formed by application of the coating material to the expendable pattern will not substantially impede or inhibit growth of the oxidation reaction product beyond the boundaries of the mold cavity as in the case of a barrier, but in fact will accept the growth of the oxidation reaction product. In this case, the oxidation reaction product of the parent metal and vapor-phase oxidant fills the mold cavity, and then infiltrates the coating material to a desired depth. Thus, the oxidation reaction product will grow beyond the boundaries of the mold cavity, and into the coating material. The resulting article is a ceramic component having a shaped surface replicating the shape-defining surface of the expendable pattern, having a ceramic composite comprising the oxidation reaction product embedding substituents of the filler material integrated with its shaped surface.

Typically, a particular coating material is dispersed in a vehicle, solvent, or other suitable liquid to form a conformable slurry, paste, or mixture which can be applied to the pattern, and conform to the intricacies of the shape-defining surface. The fidelity with which the ceramic component replicates the shape-defining surface of the expendable pattern depends at least in part upon the fidelity with which the coating material assimilates the shape-defining surface of the pattern, and the integrity of the support zones to maintain that fidelity. Generally, the finer the particles or compositional constituents of the coating material, the greater the fidelity of conformation to the shape-defining surface. Analogously, the more fluid the application mixture of the coating material, the higher the fidelity of conformation.

The coating material is applied to the shape defining surface of the expendable pattern in an amount which will yield a self-supporting structure upon elimination of the expendable pattern. As discussed above, that amount of coating material applied to the pattern may vary depending on a number of factors, including but not limited to the size of the pattern, identity of the coating material and support zone, process conditions, etc.

To facilitate application and conformation of a coating material to the expendable pattern, the coating material is typically combined with a suitable vehicle such as a liquid or solvent, which will volatilize or react with the coating material, or other material present, to yield the desired composition and suitable support zone. However, it should be understood that when choosing a particular application medium or vehicle such as a solvent, certain solvents may not be compatible with a particular pattern material being employed. For example, certain organic solvents such as acetone are not compatible when directly contacted with certain organic foams such as expanded polystyrene, and will dissolve or degrade an expendable pattern constructed of such a foam. Therefore, care should be exercised to ensure such combinations are avoided, and that combinations or mixtures including the coating material which are applied to an expendable pattern are compatible with the material composition of that pattern.

Figure 2:
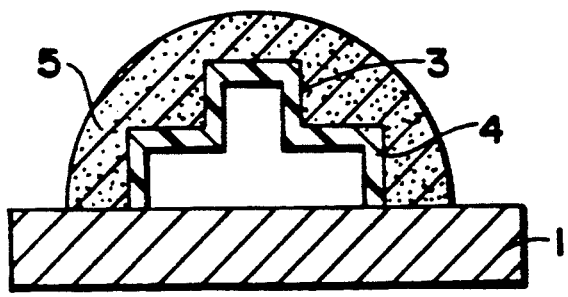
FIG. 2 is a cross-sectional view in elevation substantially identical to FIG. 1 except that an open-ended expendable pattern is shown.
Figure 3:
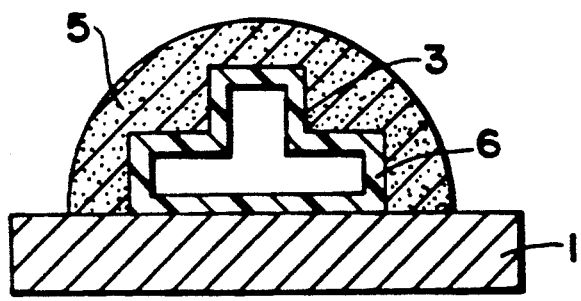
FIG. 3 is a cross-sectional view in elevation substantially identical to FIG. 1 except that a hollow expendable pattern is shown.
Figure 4:
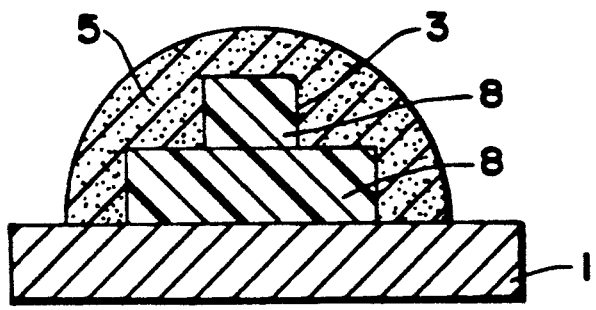
FIG. 4 is a cross-sectional view in elevation substantially identical to FIG. 1 except that a multipiece expendable pattern is shown.

In accordance with the present invention, the expendable pattern may be solid, hollow or open-ended, provided that the shape-defining surface can support the applied coating material. Additionally, an expendable pattern may comprise more than one piece or section which is assembled to produce the desired geometry. For example, referring in detail to FIGS. 1-4 wherein parent metal 1, shape-defining surface 3, and coating material 5, are each so designated throughout by the same numerals, a ceramic component can be produced having the same shaped surface by employing either a solid expendable pattern 2 shown in FIG. 1, an open-ended pattern 4 shown in FIG. 2, a hollow pattern 6 in FIG. 3, or a multipiece pattern 8 shown in FIG. 4, or similar combinations of either. In each case, the coating material including a support zone conforms to the shape-defining surface, and provides the same congruent surface.

In still another embodiment of the present invention, a layer of a filler material is positioned between the parent metal and expendable pattern prior to heating. As the setup is heated, and the molten metal reacts with a vapor-phase oxidant, growth of the oxidation reaction product occurs first into and through that filler material, and subsequently into the mold cavity. The coating material may comprise either a barrier or a filer as discussed above. The resulting product comprises a ceramic component having a shaped surface replicating the shape-defining surface of the expendable pattern, and having a ceramic composite disposed oppositely from the shaped surface.

Although the invention is described below in detail with specific reference to aluminum as the preferred parent metal, other suitable parent metals which meet the criteria of the present invention include, but are not limited to: silicon, titanium, tin, zirconium, and hafnium.

As described above, a parent metal and expendable pattern are provided such that the shape-defining surface of the pattern is positioned outwardly from the parent metal. Typically, the coating material is applied to the expendable pattern prior to juxtaposition of the parent metal and the pattern. However, the coating material can be applied to the pattern subsequent to juxtaposition. For example, the pattern may be placed onto a surface of the parent metal contained in a refractory containment vessel and then the coating material applied to the pattern. This setup comprising the containment vessel, its contents, including the expendable pattern having thereon the coating material is placed in a furnace supplied with a vapor-phase oxidant, and is heated to temperatures above the melting point of the parent metal but below the melting point of the oxidation reaction product. For example, in the case of aluminum using air as the vapor-phase oxidant to form an alumina oxidation reaction product, a suitable temperature range is generally between about 850°-1450° C., and more preferably between about 900°-1350° C. Typically, during this heating, the material composition of the expendable pattern is combusted or volatilized, thus eliminating the expendable pattern, and substantially emptying the mold cavity. It should be understood that when employing certain pattern materials, a complete emptying of the mold cavity may not occur. In some cases, one or more residues or by-products resulting from combustion or volatilization of the pattern may remain in the mold cavity. In most cases, however, the presence of minor amounts of such material will not substantially impair growth of the oxidation reaction product, or the fidelity of replication. However, it is generally preferred to employ a material which will not leave such residue in the mold cavity after elimination of the pattern.

Within this operable temperature interval or range, a body or pool of molten metal forms; and on contact with the oxidant, the molten metal will react to form a layer of oxidation reaction product. However, in certain cases such as when certain metal alloys are employed are parent metal, or when certain dopants are employed, the formation of a compound such as a spinel, e.g. magnesium aluminate spinel, may precede formation of the oxidation reaction product. Upon continued exposure to the oxidizing environment, molten metal is progressively drawn into and through any previously formed oxidation reaction product towards the oxidant into the mold cavity towards the congruent surface established with the coating material. On contact with the oxidant, molten metal is reacted to from additional oxidation reaction product developing a progressively thicker oxidation reaction product thereby progressively filling the mold cavity. In the embodiment of the present invention where the coating material comprises a barrier material, the reaction of the molten metal with the oxidant is continued until the oxidation reaction product has filled the mold cavity, and grown to the congruent surface of the coating material which prevents or inhibits further growth of the oxidation reaction product. Wherein the coating material comprises a filler, the oxidation reaction is continued further for a time sufficient such that the oxidation reaction product infiltrates the filler material surrounding the mold cavity to the desired depth.

It should be understood that the resulting polycrystalline material of the ceramic component may exhibit porosity which may be a partial or nearly complete replacement of the metal phase(s) which typically are otherwise present and distributed through the oxidation reaction product, but the volume percent of voids will depend largely on such conditions as temperature, time, type of parent metal, and dopant concentrations. Typically in these polycrystalline ceramic components, the oxidation reaction product crystallites are interconnected in more than one dimension, preferably in three dimensions, and the metal may be at least partially interconnected.

Although other suitable oxidants may be employed in conjunction with a vapor-phase oxidant in specific embodiments of the invention, the discussion below is with particular reference to use of vapor-phase oxidants. Because a gas or vapor oxidant, i.e., a vapor-phase oxidant, is used, the coating material is preferably permeable to the vapor-phase oxidant so that the vapor-phase oxidant permeates the coating material to contact the molten parent metal therewith. As described in the aforementioned Commonly Owned Patent Applications and patents, the term "vapor-phase oxidant" mans a vaporized or normally gaseous material which provides an oxidizing atmosphere. For example, oxygen or gas mixtures containing oxygen (including air) are preferred vapor-phase oxidants, as in the case where aluminum is the parent metal and aluminum oxide the desired reaction product, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the normally sole oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which contains 96 volume percent nitrogen and 4 volume percent hydrogen.

A solid or liquid oxidant may also be employed in conjunction with the vapor-phase oxidation when practicing any embodiment of the present invention wherein a filler material is employed. For example, a solid oxidant may be interdispersed or admixed in the form of particulates with the filler material. In cases where a solid oxidant is admixed with the filler comprising the coating material, the solid oxidant and coating material are first mixed and then applied to the expendable pattern. When a filler is positioned between the parent metal and expendable pattern, a solid oxidant may likewise be admixed or interdispersed with the filler material. In either case, when the oxidation reaction product infiltrates the filler of the coating material, the solid oxidant will supplement the vapor-phase oxidant. Any suitable solid oxidant may be employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product is aluminum boride. In some instances, the oxidation reaction of a parent metal with a solid oxidant may proceed so rapidly that the oxidation reaction product tends to fuss due to the exothermic nature of the process. This occurrence can degrade the microstructural uniformity of the resulting ceramic oxidation reaction product. This rapid exothermic reaction can be avoided or mitigated by choosing certain filler materials which can absorb the heat of reaction to minimize any thermal runaway effect. An example of such a suitable inert filer is one which is identical to the intended oxidation reaction product between the solid oxidant and parent metal.

If a liquid oxidant is employed in conjunction with a vapor-phase oxidant, the filler material or a portion thereof is coated or soaked as by immersion in the oxidant to impregnate the filler. The filler is then employed as described above. Reference to a liquid oxidant means one which is a liquid under the oxidation reaction conditions. A liquid oxidant may have a solid precursor, such as a salt, which is molten at the oxidation reaction conditions. Alternatively, the liquid oxidant may be a liquid precursor, e.g., a solution of a material, which is used to impregnate part or all of the filler material and which is melted or decomposed at the oxidation reaction conditions to provide a suitable oxidant moiety. Examples of liquid oxidants as herein defined include low melting glasses.

As explained in the Commonly Owned Patent Applications and patents, the addition of dopant materials to the parent metal can favorably influence or promote the oxidation reaction process. The function or functions of the dopants can depend upon a number of factors other than the dopant material itself. These factors include, for example, the particular parent metal, the end product desired, the particular combination of dopants when two or more dopants are used, the concentration of the dopant, the oxidizing environment, and the process conditions.

The dopant or dopants may be provided as alloying constituents of the parent metal, or applied to an external surface of the parent metal, preferably the growth surface, in particle or powder form. When a filler material is employed and positioned between the parent metal and expendable pattern, suitable dopants may be applied to or admixed with the filler or a part of the filer. In the case of the technique where a dopant or dopants are applied to the filler, the application may be accomplished in any suitable manner, such as by dispersing the dopants throughout part or all of the filler as coatings or in particulate form, preferably including the dopant in at least a portion of the filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A convenient manner of applying any of the dopant material is to merely soak the filler to be employed in a liquid source (e.g., a solution of dopant material).

A source of the dopant may also be provided by placing a rigid body of dopant in contact with and between at least a portion of the expendable pattern and the parent metal. For example, a thin sheet of silica-containing glass (useful as a dopant for the oxidation of an aluminum parent metal) can be placed upon a surface of the parent metal and the expendable pattern placed thereon. In the case where the dopant lies between the parent metal and the expendable pattern or bed of filler material if employed, the polycrystalline oxide structure grows substantially beyond the dopant layer (i.e., to beyond the depth of the applied dopant layer and into the cavity). Additionally or alternatively, one or more of the dopants may be externally applied to the surface of the expendable pattern which would otherwise contact the parent metal. Additionally, dopants alloyed within the parent metal may be augmented by dopant(s) applied by the aforementioned techniques. Thus, any concentration deficiencies of the dopants alloyed within the parent metal may be augmented by an additional concentration of the respective dopant(s) applied in these alternate manners, or vice versa.

Useful dopants for an aluminum parent metal, particularly with air as the oxidant, include, for example, magnesium and zinc, especially in combination with other dopants as described below. These metals, or a suitable source of the metals, may be alloyed into the aluminum-based parent metal at concentrations for each of between about 0.1–10% by weight based on the total weight of the resulting doped metal. The concentration for any one dopant will depend on such factors as the combination of dopants and the process temperature. Concentrations within the appropriate range appear to initiate the ceramic growth, enhance metal transport and favorably influence the growth morphology of the resulting oxidation reaction product.

Other dopants which are effective in promoting polycrystalline oxidation reaction growth, for aluminum-based parent metal systems using air as oxidant are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying material to be added at a lower temperature.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all or a portion of the surface of the parent metal or the corresponding surface of the expendable pattern enables local ceramic growth from the parent metal or portions thereof and lends itself to growth of the polycrystalline ceramic material into the cavity. Thus, growth of the polycrystalline ceramic material into the cavity can be somewhat controlled by the localized placement of the dopant material upon the surface of the expendable pattern. The applied coating or layer of dopant is thin relative to the intended thickness of ceramic composite, and growth or formation of the oxidation reaction product into the mold cavity extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the expendable pattern. The dopant material may, but need not, include either organic or inorganic binders, vehicles, solvents, and/or thickeners. However, as discussed above, certain application vehicles or media may not be compatible with the pattern material. More preferably, the dopant material is applied as a powder to the surface of the expendable pattern with a glue or binder which will be eliminated with the pattern during processing. One particularly preferred method of applying the dopants to the expendable pattern surface is to utilize a liquid suspension of the dopants in a water/organic binder mixture sprayed onto an expendable pattern surface in order to obtain an adherent coating which facilitates handling of the expendable pattern prior to processing.

Dopant materials when used externally are usually applied to at least a portion of the appropriate surface of the expendable pattern or parent metal as a uniform coating thereon. The quantity of dopant is effective over a wide range relative to the amount of parent metal to be reacted, and, in the case of aluminum, experiments have failed to identify either upper or lower operable limits. For example, when utilizing silicon in the form of silicon dioxide externally applied as a dopant for an aluminum-magnesium parent metal using air or oxygen as the oxidant, quantities as low as 0.00003 gram of silicon per gram of parent metal, or about 0.0001 gram of silicon per square centimeter of parent metal surface on which the $SiO_2$ dopant is applied, are effective. It also has been found that a ceramic structure is achievable form an aluminum-silicon parent metal using air or oxygen as the oxidant by using MgO as a dopant in an amount greater than about 0.0008 gram of Mg per gram of parent metal to be oxidized and greater than about 0.003 gram of Mg per square centimeter of parent metal surface upon which the MgO is applied.

The present invention provides a reliable method for producing shaped ceramic components comprising the oxidation reaction product of a molten parent metal and a vapor-phase oxidant by replicating the shape of an expendable pattern. The efficiency with which shaped expendable patterns can be produced in accordance with available techniques provides wide latitude to the geometry or shape which can be replicated in a ceramic component in accordance with the present invention.

The following are non-limiting examples of the present invention intended for illustrative purposes.

EXAMPLE 1

A block-shaped expendable pattern measuring approximately 1 inch by 1 inch by ¾ inch thick was shaped form an expanded/polystyrene material. The shape-defining surface of the pattern comprised a 1-inch by 1-inch square face, and the four 1-inch by ¾-inch rectangular faces of the pattern.

The coating material comprised 50 weight percent Wollastonite (a mineral calcium silicate, from Nyco Inc., FP Grade), and 50 weight percent plaster of paris (Bondex, from Bondex, Inc.). The Wollastonite/plaster of paris mixture was mixed with water to facilitate hydration of the plaster of paris in order to provide a support zone adjacent to the shape-defining surface of the pattern. This mixture was applied to the top and four sides of the expendable pattern in a layer approximately ½ inch thick, leaving the bottom of the pattern uncoated. This was allowed to set in order to develop the support zone.

A block of an aluminum alloy (designated alloy 380.1 from Belmont metals, having a nominally identified composition by weight of 8–8.5% Si, 2–3% Zn, and 0.196 Mg as active dopants, and 3.5% Cu as well as Fe, Mn, and Ni but the actual Mg content was sometimes higher as in the range of 0.17–0.1896), measuring 2 inches by 2 inches by ½ inch thick was placed into a loose bedding of Wollastonite particles such that one 2-inch square face was exposed. A quantity of a dopant material (Leecote, LX-60, from Acme Resin Co., comprising substantially silica) was dispersed over the exposed surface of the parent metal. The expendable pattern with the applied coating material was placed on top of the exposed surface of the parent metal such that the uncoated surface of the polystyrene cube was in contact with the metal. The pattern and exposed portions of the metal were also covered with Wollastonite such that the entire combination of parent metal and coated pattern was buried in Wollastonite.

This setup was laced into a furnace supplied with air, and heated up over 4 hours to 1100° C. The furnace temperature was held at 1100° C. for 120 hours, and then cooled down over 4 hours.

Figure 5:
FIG. 5 is a photograph in plan view of the shaped ceramic component produced in Example 1.

The setup was removed form the furnace, and the ceramic component recovered. The coating material was removed by light sandblasting. FIG. 5 shows the ceramic component produced herein after removal of excess unreacted parent metal. Measurement of the component confirms high fidelity replication of the expendable pattern.

EXAMPLE 2

A ceramic component was fabricated to replicate a block-shaped expendable pattern as in Example 1; however, in the present Example, the coating material comprised an alumina filler material.

The coating material, comprising 30 weight percent alumina filler (325 mesh, tabular alumina, from Alcoa), and 70% Leecote (LX-60, comprising substantially silica, to establish a support zone), was applied to the shape-defining surface of the expendable pattern in an approximately 0.035-inch thick layer. The Wollastonite/plaster of paris mixture described in Example 1 was applied to the alumina coating material in a layer approximately ⅛ inch thick, and allowed to set. This mixture was applied to prevent growth of the oxidation reaction product beyond the filler coating material.

The coated pattern was laced on a block of aluminum alloy (designated alloy 380.1) which was coated with a dopant, as in Example 1; and the coated pattern and still exposed portions of the metal surface were surrounded with Wollastonite such that the entire combination of parent metal and coating material-coated expendable pattern was buried in the calcium silicate as in Example 1.

This setup was placed into a furnace supplied with air, and heated up over 4 hours to 1100° C. The furnace temperature was held at 1100° C. for 120 hours, and then cooled down over 4 hours.

Figure 6:
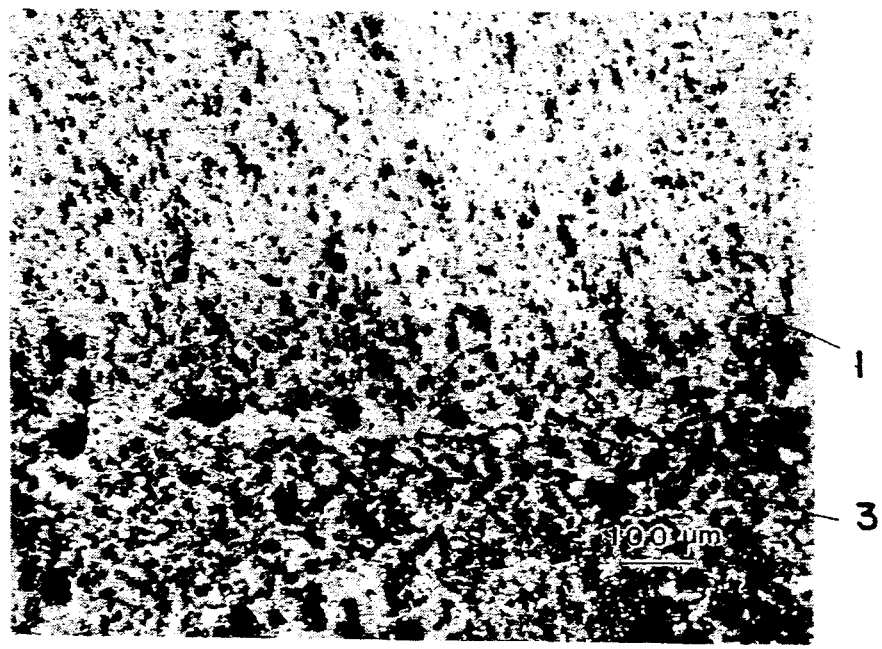
FIG. 6 is a photomicrograph taken at 100× magnification of a cross-section of the ceramic component produced in Example 2, and showing the ceramic composite integral with the shaped surface of the component.

The setup was removed from the furnace, and the ceramic product recovered. The plaster of paris/Wollastonite material was removed by light sandblasting. FIG. 6 is a photomicrograph at 100× magnification showing the ceramic component 1 integrated with the ceramic composite layer 3.

What is claimed is:

1. A setup comprising a body of parent metal, an expendable pattern and a gas-permeable coating of conformable material, wherein said expendable pattern comprises a shape-defining surface which is spaced outwardly from said body of parent metal, and further wherein said gas-permeable coating of conformable material is located on said shape-defining surface of said expendable pattern to form a congruent surface substantially congruent to and coextensive with said shape-defining surface and disposed oppositely from said body of parent metal such that said expendable pattern defines a volume between said parent metal and said congruent surface.

2. The setup of claim 1, wherein said gas-permeable coating of conformable material comprises at least one barrier material.

3. The setup of claim 1, wherein said gas-permeable coating of conformable material comprises at least one filler material.

4. The setup of claim 1, wherein said setup further comprises at least one filler material positioned between the body of parent metal and the expendable pattern.

5. The setup of claim 4, wherein said gas-permeable coating of conformable material comprises at least one barrier material.

6. The setup of claim 4, wherein said gas-permeable coating of conformable material comprises at least one filler material.

7. The setup of claim 1, wherein said setup further comprises a support zone located on the shape-defining surface of said expendable pattern.

8. The setup of claim 7, wherein said gas-permeable coating of conformable material comprises at least one barrier material.

9. The setup of claim 7, wherein said gas-permeable coating of conformable material comprises at least one filler material.

10. The setup of claim 1, wherein said parent metal comprises at least one metal selected from the group consisting of aluminum, silicon, titanium, tin, zirconium and hafnium.

11. The setup of claim 1, wherein said expendable pattern comprises at least one material selected from the group consisting of plastic and wax.

12. The setup of claim 11, wherein said expendable pattern comprises at least one material selected from the group consisting of expanded polystyrene, polyurethane and polyethylene.

13. The setup of claim 2, wherein said at least one barrier material comprises at least one material selected from the group consisting of calcium silicate, plaster of paris, Portland cement and mixtures thereof.

14. The setup of claim 3, wherein said at least one filler material comprises at least one material selected from the group consisting of alumina and silicon carbide.

15. The setup of claim 4, wherein said at least one filler material comprises at least one material selected from the group consisting of alumina and silicon carbide.

16. The setup of claim 7, wherein said support zone comprises at least one material selected from the group consisting of silica and hydrous aluminum silicates.

* * * * *